(12) United States Patent
Smeets et al.

(10) Patent No.: US 9,588,776 B2
(45) Date of Patent: Mar. 7, 2017

(54) PROCESSING DEVICE

(75) Inventors: Bernard Smeets, Dalby (SE); Patrik Ekdahl, Dalby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 868 days.

(21) Appl. No.: 13/700,473

(22) PCT Filed: May 23, 2011

(86) PCT No.: PCT/EP2011/058333
§ 371 (c)(1),
(2), (4) Date: Jan. 7, 2013

(87) PCT Pub. No.: WO2011/151211
PCT Pub. Date: Dec. 8, 2011

(65) Prior Publication Data
US 2015/0033004 A1    Jan. 29, 2015

Related U.S. Application Data

(60) Provisional application No. 61/355,187, filed on Jun. 16, 2010.

(30) Foreign Application Priority Data

Jun. 3, 2010   (EP) .................................... 10164806

(51) Int. Cl.
*G06F 1/00*   (2006.01)
*G06F 9/44*   (2006.01)
*G06F 21/57*  (2013.01)

(52) U.S. Cl.
CPC ............ *G06F 9/4416* (2013.01); *G06F 21/57* (2013.01); *G06F 2221/2137* (2013.01)

(58) Field of Classification Search
CPC ..... G06F 21/575; G06F 9/4401; G06F 9/4406
See application file for complete search history.

(56) References Cited

U.S. PATENT DOCUMENTS 5,278,976 A    1/1994  Wu
7,360,253 B2   4/2008  Frank et al.
(Continued)

OTHER PUBLICATIONS

Alchieri, E. A.P. et al. "Proactive Byzantine Quorum Systems." On the Move to Meaningful Internet Systems: OTM 2009, Nov. 1, 2009, pp. 708-725, Springer Berlin Heidelberg, Berlin, Heidelberg.

*Primary Examiner* — Jaweed A Abbaszadeh
*Assistant Examiner* — Austin Hicks
(74) *Attorney, Agent, or Firm* — Murphy, Bilak & Homiller, PLLC

(57) ABSTRACT

Disclosed herein is a processing device comprising a secured execution environment comprising means for bringing the processing device into a predetermined operational state; and a timer; a communication interface for data communication between the processing device and a remote device management system external to the processing device; wherein the secured execution environment is configured, responsive to an expiry of the timer, to bring the processing device into said predetermined operational state; and responsive to a receipt, from the remote device management system via said communications interface, of a predetermined signal, to restart the timer.

17 Claims, 3 Drawing Sheets

(56) References Cited

U.S. PATENT DOCUMENTS

2007/0192580 A1    8/2007  Challener et al.
2009/0007275 A1*   1/2009  Gehrmann .................... 726/27
2010/0023778 A1*   1/2010  Hauck et al. ................ 713/182
2010/0070800 A1*   3/2010  Hanna ............................ 714/6
2010/0275205 A1*  10/2010  Nakajima ........... G06F 9/45558
                                                         718/1

* cited by examiner

PROCESSING DEVICE

TECHNICAL FIELD

Disclosed are a processing device and corresponding method for bringing a processing device into a predetermined operational state.

BACKGROUND

Data processing systems such as personal computers, embedded systems like mobile phones or other mobile devices, and other data processing devices depend on the execution of correct software that has not been manipulated in an unauthorised way. Manipulation of the software might lead to incorrect behavior of the device or even a breaking of the fundamental security features of the device. Hence, it is particularly important to protect the core software of the device.

The operation of data processing systems like can be disturbed through malware such as viruses and Trojan horse programs. One way of protecting such user devices from these types of threats is to deploy anti-virus and internet security programs such as offered by companies like Symantec, F-Secure, and E-set. Over the years such protection tools have become very effective to block known (and similar) threats. Through the use of Intrusion Detection System technologies into these tools it is also possible to prevent many other attacks on user devices. Another approach to fight malware is to maintain a so-called "path of trusted software". Here the basic idea is that all the software that is executed on a device is authentic (and hopefully not harmful). Authenticity of the software is realised by having a secure boot which guarantees that the (basic) system that is loaded into the user's device is authentic, and by then having the system to load only software that is authentic, which may be enforced through the use of digital signatures that each software may be required to carry. An industry standard for realizing secure boot is defined by the Trusted Computing Group (TCG), see e.g. the "TCG Specification, Architecture Overview", Specification, Revision 1.4, August 2007.

Yet, it remains a problem that, despite the above measures, some attacks may still succeed and affect the functioning of a user device.

The TCG has developed a secure mechanism called attestation by which an external observer system (server) can interrogate the state of the core security engine, referred to as the Trusted Platform Module (TPM), e.g. as described in the "TCG Specification, Architecture Overview" (ibid.) and in the "TPM Main Specification Level 2 Version 1.2, Revision 103." This process is called remote attestation, and it includes the server receiving a signed value of TPM PCR register state. This allows the remote server to track for example which software was loaded in the user device. However, the above prior art remote attestation, does not provide a secure way for the server or any user device management system to correctly decide and enforce a reboot (restart) of the user device in case a user device is infected by malware.

Virus detection and IDS software will not fully prevent malware from reaching a user device. The use of signed software can be enforced for the standard components of a system (like boot software and OS software modules). For device drivers a strict enforcement is more problematic as it implies, for example, that developers of graphic cards must get their device drivers signed by the OS vendor or user device vendor. For application software the signed software methodology is often considered to be too restrictive for application developers. Therefore one often does not use a chain of trusted software (signatures) and instead uses a user interaction by which the user is requested to give his/her acceptance of this software to be installed on the device. Such an approach is for example used in the Android system for mobile devices. Thus, even in the presence of secure boot solutions such as defined by TCG there remains a need for an improved protection against malware.

The remote attestation function as described by TCG may be used by a device management system to observe the device and to conclude that the device is infected. However, this implies that the trusted part in the user device is capable in observing its full functioning, i.e. is capable of making a decision that it is infected. However, if such an infection has occurred, it was the protection software of the device that had actually failed to block the malware.

In terms of TCG, there is an additional problem in that the core of the protection mechanisms is built around the TPM which is a tamper resistant hardware module that is capable of keeping securely secrets and state variables. However, the TPM is a slave device, i.e. it acts when being instructed to do so. Hence the computation performed by the TPM is driven by the software in the user device, i.e. in case of an infection the computation performed by the TPM is driven by an infected entity. Consequently, when a remote attestation request arrives the malware may put the device back in a seemingly correct state, hide itself, and start to process the attestation request. When the response of the attestation is finalized the malware may then again take control. In the meantime, the management system still gets the indications from the device that everything is ok, although the management system may have indication from other observations that something is wrong with the operations of the device.

U.S. Pat. No. 7,360,253 discloses a method of encouraging a known operational state in a computer. The computer includes a watchdog circuit and executes a monitor system. The watchdog circuit includes a timer, and upon expiry of the timer, the computer is rebooted unless the monitor system sends a message to the watchdog circuit which causes a reset of the timer.

However, it remains a problem that the security of the above prior art method relies upon the monitor system. Hence, if the monitor system is attacked the security of the method may be compromised.

SUMMARY

Disclosed herein is a processing device comprising:
- a secured execution environment comprising means for bringing the processing device into a predetermined operational state; and a timer;
- a communication interface for data communication between the processing device and a remote device management system external to the processing device;

wherein the secured execution environment is configured
- responsive to an expiry of the timer, to bring the processing device into said predetermined operational state;
- responsive to a receipt, from the remote device management system via said communications interface, of a trigger signal, to restart the timer.

Hence, embodiments of the processing device disclosed herein provide an efficient yet easily implementable mechanism for enforcing the processing device to be brought into a predetermined operational state, e.g. a state causing reload of the initial authentic software and thus resumption of normal operation of an infected user device that is under control of a managed system (such as mobile phones in a operators network or laptops/PCs in a corporate network).

By providing a remote device management system and a timer in a trusted, secured environment, the security of the monitoring and rebooting mechanism is not based exclusively on entities that are included in the device and thus subject to malicious attacks.

As the software performing the determination whether the device is infected resides in the device management system, the complexity of the software in the trusted execution environment may be kept low, thus facilitating the maintenance of trust in the trusted execution environment.

The term "secured execution environment" as used herein is intended to comprise any suitable means for executing program code on the processing device, wherein the program code is shielded from the rest of the software executed on the processing device so as to prevent the other software from reading and/or modifying data and/or program code in the secured execution environment. The secured execution environment, for the purpose of the present description also referred to as Trusted Execution Environment (TEE), may be protected against alteration by any suitable protection mechanism. The TEE may be implemented as a software module, as a hardware module or a combination thereof. For example, the TEE may be implemented as an augmented trusted platform module (TPM, see e.g. the TPM Main Specification Level 2 Version 1.2, Revision 103), further configured to provide functionality for enforcing a reboot of the processing device, for maintaining a programmable counter, where the counter is responsive to receipt of an external trigger signal. Alternatively, the TEE may be embodied as a combination of a standard TPM and a suitable security hardware architecture such as the ARM Trustzone® hardware, e.g. as described on the website http://arm.com/products/processors/technologies/trustzone.php, or another suitable hardware architecture. Yet alternatively, the secured execution environment may be embodied as a TrustZone secure world further configured to include one or more timers and one or more interrupts.

Generally, the timer value of the timer may be restarted from any suitable value, e.g. the same value as for a previous restart of the timer, or a newly set value, i.e. restarting the timer may include setting the timer to a new value. It will be appreciated that the choice of timer value may be determined by a number of factors. For example shorter timer values result in increased data traffic, as trigger signals will have to be communicated and processed more frequently. Larger timer values allow more time for the device management system (DMS) to detect possible irregularities in the behaviour of the user device; on the other hand larger timer values increase the period of time during which an infected user device may operate in an unauthorised way without a reboot being enforced. In some embodiments the timer value may be chosen between several hours and several days; however shorter and/or longer time intervals may equally be chosen. In some embodiments the DMS may determine a suitable timer value for the next timer interval when sending a trigger signal. For example, the timer values may be determined based on known threat situations, previous behaviour of the user device, and/or other factors. The determined new timer value may then be communicated to the user device, e.g. as part of the trigger signal. The trigger signal may take the form of a go-ahead command which may include a timer value.

In some embodiments, bringing the processing device into a predetermined operational state comprises causing the processing device to reboot. Hence, in some embodiments the TEE is configured to enforce a secure boot and includes immutable timer interrupts.

The remote device management system (DMS) may be configured to perform software updates and/or other device management operations in respect of the processing device. In some embodiments the DMS is configured to collect information indicative of the operational state of the processing device. In some embodiments, the DMS may be configured to receive such information from the processing device, e.g. by means of a suitable remote attestation mechanism. Accordingly the processing device may be adapted to transmit, via the communications interface, a message indicative of the operational state to the remote device management system, e.g. in the form of remote attestation messages such as remote attestation responses responsive to the receipt of remote attestation requests from the DMS. A message indicative of the operational state of the processing device may include one or more values of one or more predetermined registers of the processing device. Additionally or alternatively, the DMS may be configured to receive the information indicative of the operational state of the processing device in the form of behavioural observations, e.g. by observing inbound and/or outbound data traffic on the communications interface. For example, the DMS may operate as a network intrusion detection system (NIDS.)

In some embodiments, the secured execution environment is configured, e.g. suitably programmed, to perform a hard reboot of the processing device and load a digitally signed software image if the secured execution environment does not receive a predetermined message (in the following also referred to as a "go-ahead" ticket) from the DMS before a predetermined set time limit. If the ticket arrives the timer is restarted and normal device operation is continued. If no correct ticket arrives then the hard reboot occurs and the device will reboot and load the signed software image. The signed software image may comprise program code adapted to provide communication functionality that allows the DMS to communicate with the device. Consequently, the DMS may perform a device interrogation enabling the DMS to confirm that a reboot occurred and that the signed software image was loaded. Hence, the device is prevented from just ignoring the reboot command or simulating that it does the restart without the DMS detecting the failure to actually perform a boot.

Subsequently, the DMS may take subsequent actions, such as causing the device to load other software modules (from the DMS or from device own storage) and/or use a remote attestation to check that the next state of operation has been properly reached before sending further commands. In such a way the DMS can restore the processing device and remove any malware that had infected the processing device.

The term data processing device is intended to comprise any computer, such as personal computer, portable radio communications equipment, and other handheld or portable data processing devices. The term portable radio communications equipment includes all equipment such as mobile telephones, pagers, communicators, electronic organisers, smart phones, personal digital assistants (PDAs), handheld computers, laptop computers, or the like.

The present invention relates to different aspects including the processing device described above and in the following, corresponding methods, systems and products, each yielding one or more of the benefits and advantages described in connection with one of the above-mentioned processing device, and each having one or more embodiments corresponding to the embodiments described in connection with one the above-mentioned processing device.

More specifically, according to another aspect, a device management system is disclosed for controlling operation of a remote processing device external to the processing device, the remote processing device comprising a secured execution environment comprising a timer and means for bringing the processing device into a predetermined operational state. Embodiments of the device management system comprise:

a communications interface for data communication between the device management system and the remote processing device;

processing means configured
- to determine an operational state of the remote processing system;
- responsive to the determined operational state to send a trigger signal to the processing device via the communications interface for causing the processing device to restart the timer.

According to yet another aspect, a communications system may comprise a processing device as disclosed herein and a device management system disclosed herein.

According to yet another aspect, a method of controlling operation of a processing device by a remote device management system external to the processing device is disclosed, the processing device comprising a secured execution environment comprising a timer and means for bringing the processing device into a predetermined operational state. Embodiments of the method comprise:
- responsive to an expiry of the timer, bringing the processing device into said predetermined operational state;
- responsive to a receipt, from the remote device management system via a communications interface of the processing device, of a trigger signal, restarting the timer.

According to yet another aspect, a secured execution environment for a processing device is disclosed herein. Embodiments of the secured execution environment comprise a timer and means for bringing the processing device into a predetermined operational state; and are configured to perform the steps of the method described herein.

BRIEF DESCRIPTION OF THE DRAWINGS

The above and other aspects will be apparent and elucidated from the embodiments described in the following with reference to the drawing in which.

DETAILED DESCRIPTION

Figure 1:
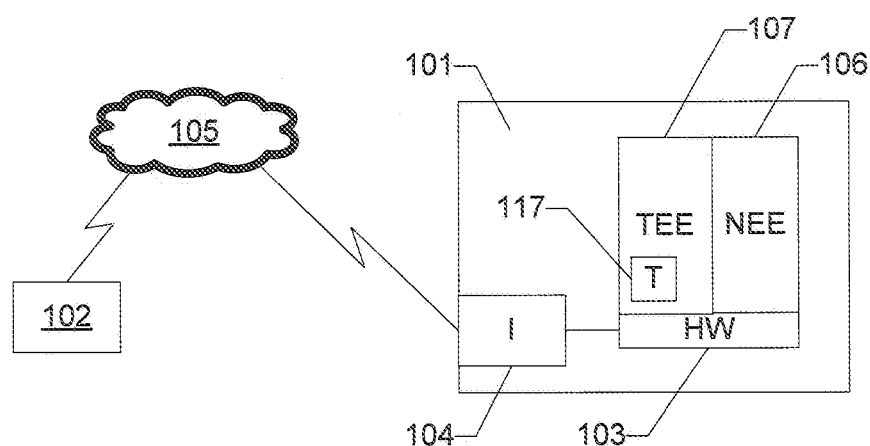
FIG. 1 shows a schematic block diagram of a system for establishing a known operational state of a data processing device.

FIG. 1 shows a schematic block diagram of a system for establishing a known operational state of a data processing device.

The system comprises a processing device (in the following also referred to as user device or UD) 101, such as a mobile phone, a modem, a laptop, a personal computer, a PDA, or any other user-operated processing device that is managed and/or controlled by a device management system (DMS) 102. To this end, the processing device 101 is connected via a communications network 105 to the device management system 102. In the example of FIG. 1, the DMS is shown as a single entity, e.g. a network node of the communications network 105, a server computer, and/or the like. It will be appreciated, however, that the DMS may be implemented by a plurality of physical entities, e.g. a cooperative set of nodes, collectively implementing the DMS functions. The processing device 101 comprises a hardware block 103, a normal execution environment (NEE) 106 and a trusted execution environment (TEE) 107, both implemented by the hardware block 103. The hardware block may comprise a central processing unit (CPU), a memory system, a set of reboot/reset functions, one or more hardware interrupts and/or timers, one or more memory protection units MMUs or MPUs, and/or similar hardware components.

The normal execution environment (NEE) is configured to execute the operating system (OS) of the processing device and one or more application programs. The Trusted execution environment (TEE) is configured to be immutable by the NEE, and is configured to execute a set of trusted software components. The TEE has one or more secure timers 117 and interrupts which the software in the NEE cannot modify or influence. An example of a processing hardware implementing a normal and trusted execution environment is the ARM TrustZone system. Alternatively the NEE and/or the TEE may be implemented by any other suitable combination of hardware and software, e.g. a suitable memory protection unit. The processing device 101 comprises a communications interface 104 comprising circuitry and/or devices suitable for enabling the processing device to communicate data with the DMS via a wired or wireless communications network, e.g. a cellular telecommunications network, e.g. GSM, WCDMA, or the like, a wired or wireless local area network, a wide area network, an internet, etc., or a combination thereof. Consequently, examples of suitable communications interfaces include an RF interface, such as the main antenna of a cellular telephone (not shown), or another antenna within the cellular telephone, such as a Bluetooth transceiver, or the like. Other examples of suitable interfaces include a cable modem, a telephone modem, an Integrated Services Digital Network (ISDN) adapter, a Digital Subscriber Line (DSL) adapter, a satellite transceiver, an Ethernet adapter, or the like. In some embodiments, the communication between the DMS and the UD may be performed via the signalling layer of a radio interface. In other embodiments, the communication may be performed via the internet.

Figure 2:
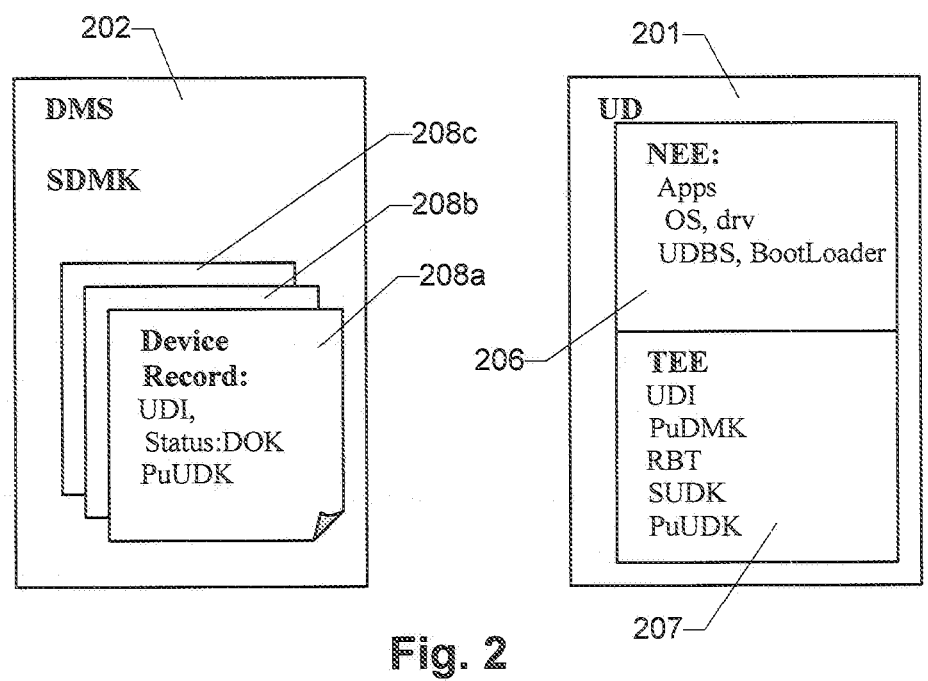
FIG. 2 schematically illustrates an example of a device management system and a processing device.

FIG. 2 schematically illustrates an example of a device management system (DMS) 202 and a processing device (UD) 201, e.g. the DMS and processing device described in connection with FIG. 1.

The DMS 202 holds a record for each device or group of devices managed by the DMS. In the example of FIG. 2, the DMS is illustrated to hold three records 208a-c corresponding to three respective devices or groups of devices, only one of which is explicitly shown in FIG. 2. However, it will be appreciated that the number of records held by a DMS depends on the number of devices or groups of devices managed by the DMS, and that this number may vary. The records 208a-c may be stored in the DMS in any suitable way, e.g. a suitable data storage device such as a hard disc. In the example of FIG. 2, the records include record 208a associated with UD 201. Record 208a comprises data indicative of the identity of the device (UDI), a device OK indicator (DOK), and a public key (PuUDK) associated with the device or group of devices. Optionally, the record 208a may further comprise the value of a programmed reboot timer (RBT), thus allowing device-specific timer values or even timer values that may change over time. The UDI may be a device ID that uniquely identifies the device or group of devices. The public key may be a public key of any suitable asymmetric cryptographic method suitable for ensuring authenticity and/or secrecy. A suitable cryptographic authentication process may be any suitable cryptographic process for verifying the authenticity of data, i.e. to ensure that the data in fact originates from the expected entity and that it was not forged or modified.

The DMS further has stored thereon, e.g. in a trusted environment of the DMA, a secret device management key (SDMK). The SDMK may be a private key known only to the DMS and securely stored by the DMS. In the example of FIG. 2, the DMS holds only a single SDMK; however, in alternative embodiments, the DMS may hold, e.g. stored as part of the records 208 a-c, different SDMKs associated with the respective devices or groups of devices.

The SDMK may be a private key of any suitable cryptographic system for protecting the authenticity of messages, in particular commands, sent by the DMS to the UD. Alternatively or additionally, DMS commands to the UD may be protected by other suitable protection methods e.g. as those used in OMA DM.

As described above, the UD comprises a trusted execution environment (TEE) 207 and a normal execution environment (NEE) 206. The TEE 207 is programmed with a public device management key (PuDMK) corresponding to the SDMK of the DMS, i.e. such that the SDMK and the PuDMK form a public-private key pair of a cryptographic system, e.g. a PKI. The TEE 207 is further programmed with a secret user device key (SUDK) and a user device identity UDI. The TEE further comprises a programmed reboot timer (RBT) and a private-public user device key pair, i.e. a public user device key (PuUDK) and a corresponding private user device key (SUDK). The TEE constitutes a trusted environment, trusted by the DMS to be unalterable by e.g. the NEE.

The NEE 206 is configured to execute the normal operating software, e.g. including an operating system (OS) and application software. The operating software comprises a signed portion, in the following also referred to as the user device base system (UDBS), which can be booted independently from other portions, if any, of the operating software, and which is configured to allow data communication with the DMS via the communications interface 104. The USDB is signed and can be verified against the public user device key PuUDK. Alternatively, the UDBS may be a separate, signed software image, separate from the normal operating software, which can be booted independently from the normal operating software. For example, the UDBS may be ROM code included or separate from the TEE. Yet alternatively, authenticity of the UDBS may be verifiable by the TEE using another suitable cryptographic mechanism. The NEE further comprises a BootLoader for controlling the initial stages of the boot process and for loading the UDBS into memory before execution. When booted via the TEE after a hard reset (triggered by an expiry of the RBT), the services provided by the UDBS constitute trusted (from DMS perspective) services. The UDBS provides functionality for restoring the software of the UD to a state that can be trusted. Depending on the complexity of the UD software and need for recovery, the UDBS can perform this restoration by itself or with cooperation with the DMS (e.g. download of original software). The DMS can interrogate the UD by requiring a remote attestation operation of the state of the TEE which keeps track of what software has been booted/started.

Figure 3:
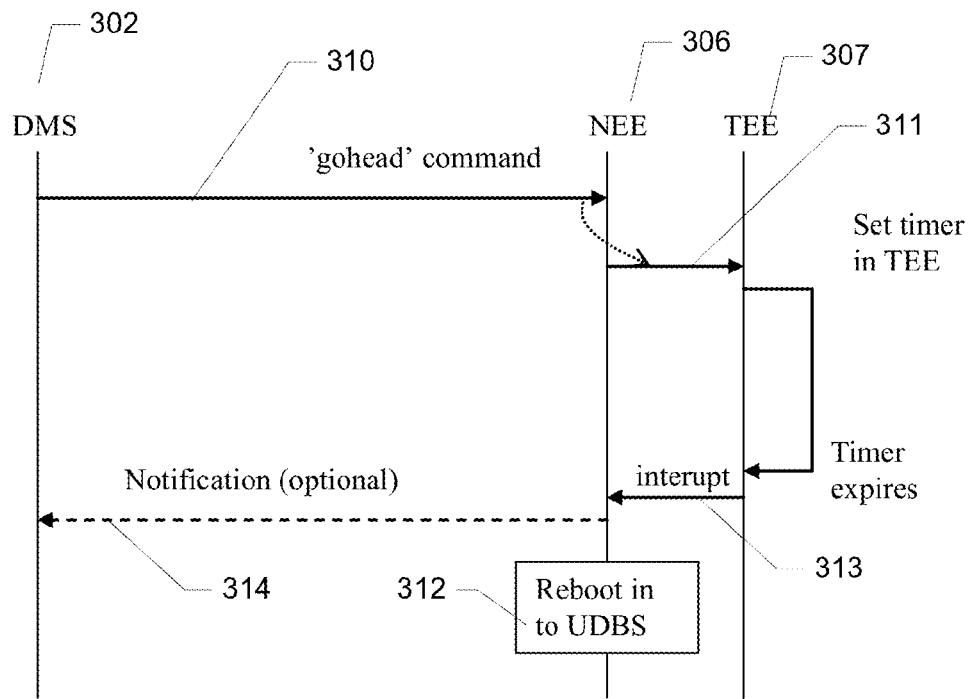
FIG. 3 illustrates an example of the message flow between a device management system, a normal execution environment and a trusted execution environment prior to expiry of a reboot timer and during reboot of a processing device.

FIG. 3 illustrates an example of the message flow between the DMS 302, the NEE 306, and the TEE 307 prior to expiry of the RBT and during reboot of the UD. Each time the TEE receives a predetermined 'go-ahead' command from the DMS, the TEE restarts and optionally sets the reboot timer. The 'go-ahead' command 310 is sent from the DMS to the UD where it is received by the NEE and forwarded by the software of the NEE to the TEE as illustrated by arrow 311, thus causing the TEE to set/restart the reboot timer. The TEE may either restart the reboot timer from a predetermined timer value, e.g. a value stored in the TEE, or set the reboot timer to a value received as part of the 'go-ahead' command and restart the reboot timer from the set timer value.

The TEE thus starts off the reboot timer and, if this reboot timer expires (i.e. if no go-ahead' command is received prior to expiry of the timer), the TEE triggers a hardware reset and reboot 312 of the UD to load the UDBS. To this end the TEE sends an interrupt signal 313 to the NEE causing the reboot 312. Responsive to the interrupt signal 313, the NEE may send a notification 314 to the DMS informing the DMS of the reboot.

Hence, if the NEE fails or refuses to pass a received 'go-ahead' command 310 to the TEE before the timer expires, the UD will reboot into the UDBS to provide only trusted services. In order to prevent the NEE or another external unauthorised entity to pass wrong or disruptive go-ahead commands to the TEE, the go-ahead command 310 from the DMS is signed with the SDMK allowing the TEE to verify the received Go-ahead command against the PuDMK.

Figure 4:
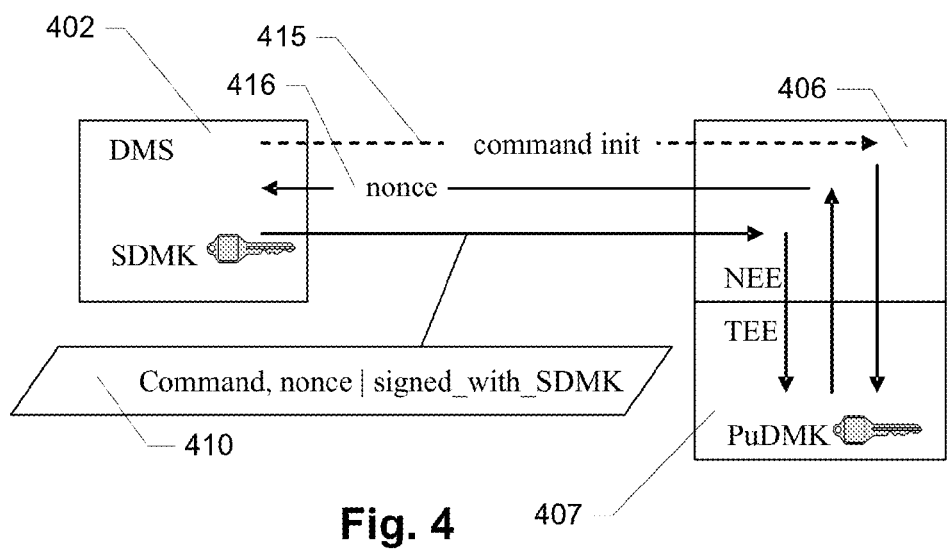
FIG. 4 illustrates in more detail the communication of an example of a go-ahead command.

FIG. 4 illustrates in more detail an example of the communication of the go-ahead command. The process is initiated by the DMS 402 sending an init command 415 via the NEE 406 to the TEE 407. For example, the DMS may comprise a timer associated with each processing device managed by the device management system, and having a timer value corresponding to, e.g. sufficiently shorter than, the timer value of the reboot timer of the TEE. In response to the init command 415, the TEE sends a nonce 416 to the DMS via the NEE. The nonce may be any data item, e.g. a number, that is only used once (at least the time interval between a repetition should be sufficiently long). To ensure that a nonce is used only once, it may be a time-variant, e.g. including a suitably fine-grained timestamp in its value, or it may include a random number generated with enough random bits to ensure a probabilistically insignificant chance of repeating a previously generated value. It will be appreciated that the process may be initiated by the UD instead of the DMS, e.g. by the TEE sending the nonce and requesting a go-ahead command. For example, the TEE may be triggered to request a go-ahead command at a predetermined time before expiry of the reboot timer. When the process is initiated by the DMS, the risk of denial of service attacks on the DMS is reduced.

In response to receiving the nonce, the DMS may determine whether to actually send the go-ahead command. Alternatively, the determination may be performed prior to sending the init command 415. The determination may be based on received system information, e.g. responsive to a remote attestation request. Alternatively the DMS may observe and inbound and/or outbound network traffic of the UD so as to identify any unusual patterns by using Network Intrusion Detection System techniques such used in IDS's like Bro or Snort. For example, the DMS may continuously or periodically verify proper operation of the processing device and maintain a corresponding flag (e.g. the DOK flag shown in FIG. 2) in the record associated with the processing device. When the DMS has determined that a go-ahead command may be issued, the DMS sends the actual go-ahead command 410 which may include a command identifying the message as a go-ahead command and the previously received nonce 416. The go-ahead command may include additional information e.g. a timer value to which the TEE should set its reboot timer. Some or all of the contents of the go-ahead command are signed with the SDMK. When the interaction for such go-ahead commands is stateful in the sense that the command 310 from the DMS to the TEE/UD contains a nonce that the TEE has previously securely passed to the DMS, the risk of harmful replay of commands is reduced. Upon receipt of the command 410 from the DMS via the NEE, the TEE verifies the signature based on its PuDMK and compares the received nonce with the previously sent nonce 416. If both verifications are successful, the TEE restarts the boot timer, optionally including setting the timer to a new value, e.g. a value received with the go-ahead command.

Again referring to FIG. 3, after the UDBS has been booted in step 312, the DMS may interact securely with the UD and ensure resumption of normal operation with authentic software. An example of the process of recovering the UD after reboot of the UDBS is illustrated in FIG. 5 which shows an example of the message flow between the DMS 502, the NEE 506 and the TEE 507 during the recovery process.

In step 512, upon receiving of a reboot signal from the TEE, the NEE reboots into the UDBS as described in connection with FIG. 3. The state information maintained in the TEE (and retained during the reboot into the UDBS as illustrated by step 521, e.g. in situation where the TEE needs to retain some register values, e.g. in order to retain information about the cause of the reboot) is updated after the UDBS has started operation as illustrated by step 522. For example, In a TCG framework "Update state" may involve an update of the Platform Configuration Register (PCR).

After the UDBS has been booted (e.g., the UDBS may be configured to contact the DMS so as to inform the DMS that the UD is running the Base System) the DMS can interact securely with the UD and it sends a signed attestation request 523 to the UD which is received by the NEE executing the UDBS and forwarded (524) to the TEE. The attestation request may include a nonce. Upon receipt of an answer 525 from the TEE, the NEE executing the UDBS sends a signed response 526 to the DMS. The response may include the nonce that was received in the attestation request. Furthermore, the response may include one or more suitable state variables, e.g. the PCR. Based on the response 526, the DMS may now verify that the boot was successful. Upon successful determination by the DMS that the boot was successful, the DMS may send one or more maintenance commands 527 to the UD, in case the DMS determines that one or more maintenance operations 528 are to be performed by the DMS, or to cause the UD to perform some maintenance operations on its own, before the UD boots its operating system and resumes normal operation (step 530). As part of the maintenance process, the TEE may have saved state information prior to the reboot. The state information may be forwarded by the TEE to the NEE as illustrated by arrow 531. The NEE may transfer the state information to the DMS and/or use it in the pre-boot maintenance 528. As the TPM is operated as a slave, it is subsequently controlled by a suitable command to update the PCR (529), thus allowing recording that the maintenance operation took place.

Figure 5:
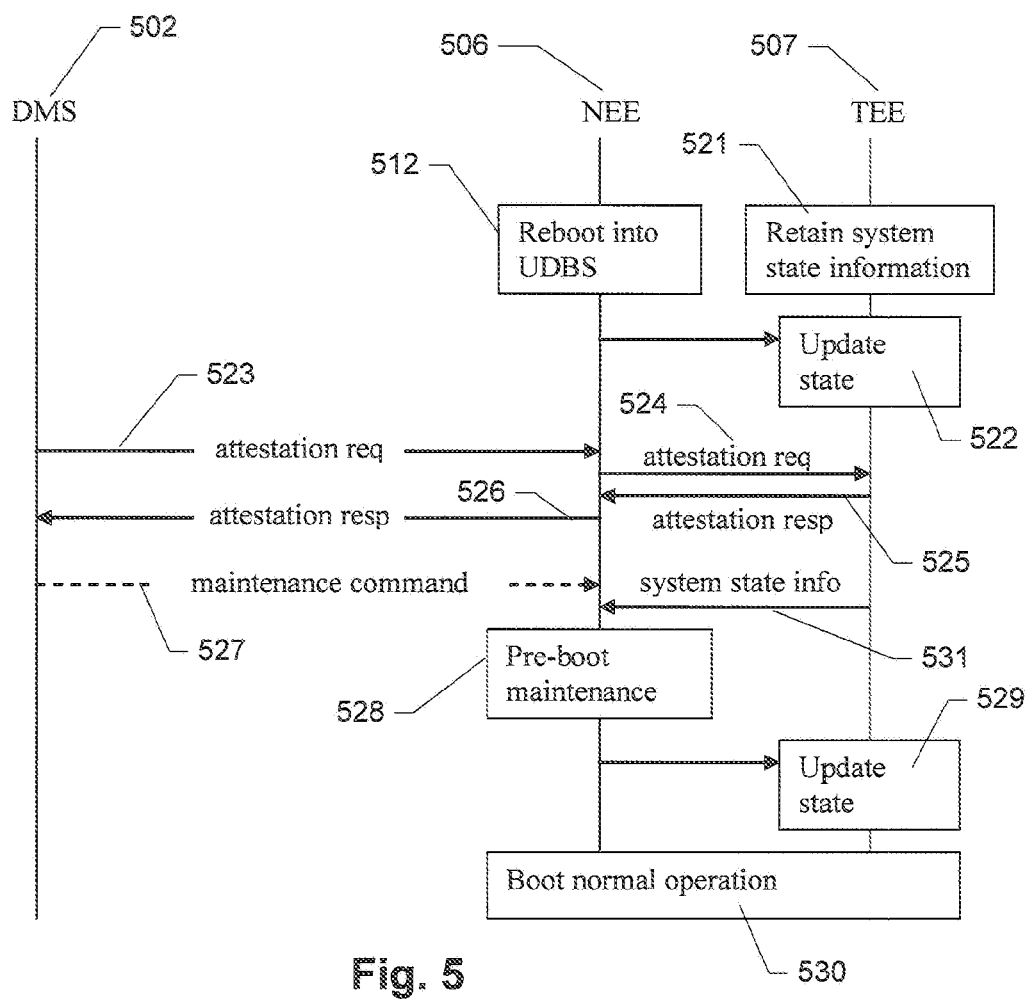
FIG. 5 shows an example of the message flow between a device management system, a normal execution environment and a trusted execution environment during a recovery process.

The process of FIG. 5 is thus an example of a UD recovery process after boot of the UDBS, where the DMS verifies that a proper reboot of the UD has occurred and where maintenance operations may be performed before normal operation is restored.

Hence, in the above, embodiments have been described of a secure system for device recovery where one or more managed devices with a secure part are rebooted through a local timer and ticket dependency from a remote management system. Although some embodiments have been described and shown in detail, the invention is not restricted to them, but may also be embodied in other ways within the scope of the subject matter defined in the following claims.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A processing device comprising:
 a secured execution environment comprising a timer and electronic hardware configured to bring the processing device into a predetermined operational state;
 a communications interface for data communication between the processing device and a remote device management system external to the processing device;
 wherein the secured execution environment is configured to:
  bring the processing device into said predetermined operational state, responsive to an expiry of the timer; and
  restart the timer when the timer is running and before the expiry of the timer, responsive to a receipt of a trigger signal from the remote device management system, via said communications interface.

2. The processing device of claim 1, wherein the trigger signal comprises a timer value, and wherein the secured execution environment is adapted to restart the timer from the received timer value.

3. The processing device claim 1, wherein the secured execution environment is adapted to send a first nonce to the remote device management system, to extract a second nonce from the received trigger signal, to compare the first and second nonce, and to restart the timer only if the first and second nonce are equal.

4. The processing device of claim 3, wherein the secured execution environment is configured to verify the authenticity of the second nonce, and to restart the timer only if the authenticity is successfully verified.

5. The processing device of claim 1, wherein the secured execution environment is configured to bring the processing device into said predetermined operational state by rebooting the processing device in a predetermined state.

6. The processing device of claim 5, wherein rebooting comprises verifying authenticity of a basic software component for providing a set of basic system functions, and loading the basic software component conditioned on a successful verification.

7. The processing device of claim 5, wherein the processing device is configured to, after reboot of the processing device in the predetermined state, send a message to the remote device management system indicative of the operational state of the processing device.

8. The processing device of claim 7, wherein sending a message to the remote device management system indicative of the operational state of the processing device comprises receiving an attestation request from the remote device management system and responding to the received attestation request by communicating at least a value of a state variable indicative of the operational state of the processing device maintained by the secured execution environment.

9. The processing device of claim 1, wherein the secured execution environment comprises an identifier identifying the processing device, a public key associated with the remote device management system, the timer, and a cryptographic key for verifying authenticity of the predetermined operational state.

10. The processing device of claim 1, further comprising a normal execution environment having a lower security level than the secured execution environment; wherein the secured execution environment is secured against unauthorized alteration by the normal execution environment.

11. The processing device of claim 10, wherein the normal execution environment is configured with an operating system and application software for operating the processing device.

12. The processing device of claim 1, configured to provide cryptographically protected communication between the remote device management system and the secured execution environment.

13. A device management system for controlling operation of a remote processing device external to the device management system, the remote processing device comprising a secured execution environment comprising a timer and electronic hardware configured to bring the remote processing device into a predetermined operational state, the device management system comprising:
   a communications interface for data communication between the device management system and the remote processing device; and
   one or more processors configured to:
      determine an operational state of the remote processing device; and
         send a trigger signal to the remote processing device via the communications interface, responsive to the determined operational state, for causing the remote processing device to restart the timer when the timer is running and before the expiry of the timer.

14. The device management system of claim 13, wherein the device management system is further configured to:
   observe and analyze data traffic of one or more remote processing devices so as to determine one or more parameters indicative of a normal operation of the one or more remote processing devices; and,
   conditioned on the determined one or more parameters, send a predetermined signal to the one or more remote processing devices for causing the remote processing device to restart the timer.

15. A communications system comprising the device management system of claim 13 and further comprising the remote processing device, wherein the remote processing device comprises:
   a secured execution environment comprising a timer and electronic hardware configured to bring the remote processing device into a predetermined operational state;
   a communications interface for data communication between the remote processing device and the device management system external to the remote processing device;
   wherein the secured execution environment is configured to:
      bring the remote processing device into said predetermined operational state, responsive to an expiry of the timer; and
      restart the timer when the timer is running and before the expiry of the timer, responsive to a receipt of a trigger signal from the device management system, via said communications interface.

16. A method of controlling operation of a processing device by a remote device management system external to the processing device, the processing device comprising a secured execution environment comprising a timer and means for bringing the processing device into a predetermined operational state, the method comprising:
   bringing the processing device into said predetermined operational state, responsive to an expiry of the timer; and
   restarting the timer when the timer is running and before the expiry of the timer, responsive to receiving a trigger signal from the remote device management system, via a communications interface of the processing device.

17. A secured execution environment for a processing device, the secured execution environment comprising a timer and electronic hardware configured to bringing the processing device into a predetermined operational state, wherein the secured execution environment is configured to:
   bring the processing device into said predetermined operational state, responsive to an expiry of the timer; and
   restart the timer when the timer is running and before the expiry of the timer, responsive to receiving a trigger signal from the remote device management system, via a communications interface of the processing device.

* * * * *